(12) United States Patent
Parikh

(10) Patent No.: US 7,558,787 B2
(45) Date of Patent: Jul. 7, 2009

(54) AUTOMATIC RELEVANCE AND VARIETY CHECKING FOR WEB AND VERTICAL SEARCH ENGINES

(75) Inventor: Jignashu G. Parikh, Gujarat (IN)

(73) Assignee: Yahoo! Inc., Sunnyvale, CA (US)

( * ) Notice: Subject to any disclaimer, the term of this patent is extended or adjusted under 35 U.S.C. 154(b) by 260 days.

(21) Appl. No.: 11/481,735

(22) Filed: Jul. 5, 2006

(65) Prior Publication Data

US 2008/0010269 A1    Jan. 10, 2008

(51) Int. Cl.
G06F 17/30 (2006.01)
(52) U.S. Cl. .............................. 707/3; 707/5; 707/100
(58) Field of Classification Search .................. 707/100, 707/5, 3
See application file for complete search history.

(56) References Cited

U.S. PATENT DOCUMENTS

| | | | | |
|---|---|---|---|---|
| 6,006,225 A * | 12/1999 | Bowman et al. | ................ | 707/5 |
| 6,236,987 B1 * | 5/2001 | Horowitz et al. | ............... | 707/3 |
| 6,701,310 B1 * | 3/2004 | Sugiura et al. | ................ | 707/5 |
| 6,999,959 B1 * | 2/2006 | Lawrence et al. | .............. | 707/5 |
| 2003/0172063 A1 * | 9/2003 | Gutta et al. | .................... | 707/5 |
| 2004/0236736 A1 * | 11/2004 | Whitman et al. | ............... | 707/3 |
| 2006/0112085 A1 * | 5/2006 | Zijlstra et al. | .................. | 707/3 |
| 2006/0117003 A1 * | 6/2006 | Ortega et al. | .................. | 707/4 |
| 2006/0161520 A1 * | 7/2006 | Brewer et al. | ................. | 707/3 |

* cited by examiner

*Primary Examiner*—Etienne P LeRoux
*Assistant Examiner*—Thuy (Tiffany) Bui
(74) *Attorney, Agent, or Firm*—Hickman Palermo Truong & Becker LLP; Deborah L. Caswell

(57) ABSTRACT

Techniques for automatically checking the relevance and variety of search results are provided. A query is submitted to a search engine, which uses a search algorithm to obtain search results based on the query. A set of the top n related terms for the query is identified. For each related term in the set of terms, its relative frequency in relation to all terms in the set of terms is determined. If the term does not occur in any of the results, then a loss in variety proportional to the relative term frequency for the term has occurred. Otherwise, the relevance of the search results is calculated by comparing the proportion of results containing the term with the relative term frequency for a term. This process is repeated for all terms in the set of related terms to produce a total variety and relevance for the results.

26 Claims, 6 Drawing Sheets

AUTOMATIC RELEVANCE AND VARIETY CHECKING FOR WEB AND VERTICAL SEARCH ENGINES

FIELD OF THE INVENTION

The present invention relates to search engines and, more specifically, to a technique for automatically checking the relevance and variety of search results.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

With the advent of the Internet and the World Wide Web ("Web") a wide array of information is instantly accessible to individuals. However, because the Web is expanding at a rapid pace, the ability to find desired Web content is becoming increasingly difficult. Thus, search engines have been developed to assist individuals in finding the Web content they desire. Such search engines are normally accessible via search Web portals, such as the Yahoo! Inc. Web portal.

In order to search for Web content, users typically visit a web portal page. On a web portal page, users submit search queries as phrases representing the scope of the content they would like to view. Based on the search query, the web portal page invokes the search engine to find relevant Web pages containing the Web content and displays the results to the user.

A constant goal of search engines and Web portals is to ensure that the results shown to the user are relevant to the user's query. One approach for determining the relevancy of search results is by manually screening search results for each query. Typically, this requires that a developer or programmer run the search query on the search engine and manually check each of the results for relevance. The results are then ranked in terms of relevance and the most relevant results are displayed first to a user on a Web portal page. This approach, however, is very cumbersome and is prone to error. Further, because the Web is growing at a rapid pace, the amount of results that may potentially satisfy a search query heavily outweigh the manpower required to rank the relevance of each of the results.

Another approach is to track which results have been frequently "clicked" on by users of the Web portal. A Web portal user clicks on a result if the user wishes to visit or select the result for viewing. By clicking the result, the user is redirected from the Web portal to the desired Web page containing Web content. Web portals normally have a way of tracking the amount of clicks a particular result or link has received. Therefore, Web portals may determine which results are relevant by tracking which results have been clicked on the most by Web portal users. However, this approach is also prone to error. For example, although a user may have clicked on a result, it does not necessarily mean that the result is relevant. Specifically, search results displayed to a user are usually in the form of a title and an abstract. Many times, however, the title and abstract are not accurate indications of the actual content of a search result. Thus, although a user may have clicked on a particular result, the result may have no relevance to the search query.

Yet another drawback to the above approaches is the lack of variety checking. Although the relevance of search results is considered, there is no way for ensuring that an adequate variety of results are displayed to the user. For instance, some search queries may request Web content relating to a general topic. The general topic might contain many sub-topics that are also relevant to the search query. However, the above approaches do not attempt to ensure that enough results relating to sub-topics are displayed to the user when a query for the general topic is received.

Therefore, what is desired is an improved mechanism for automatically checking the relevance and variety of search results that does not suffer from the drawbacks of prior approaches.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An automatic relevance and variety checking system includes a search engine and search algorithm. The search engine utilizes the search algorithm to identify content related to a query which is submitted by a user. The user typically submits the query through a graphical user interface such as a web search portal page. The search engine uses the query to identify results within a data source that satisfy the query criteria. When the search engine identifies the results, the search engine causes a GUI screen to be presented to the user displaying a number of the search results. Typically, these results are ranked in some order as determined by the search algorithm. In order to ensure that results produced by the search engine have enough variety and are also relevant, the system also includes a testing interface. The testing interface allows search algorithm and search engine developers to test the variety and relevance of search results according to the process as further described herein.

Figure 1:
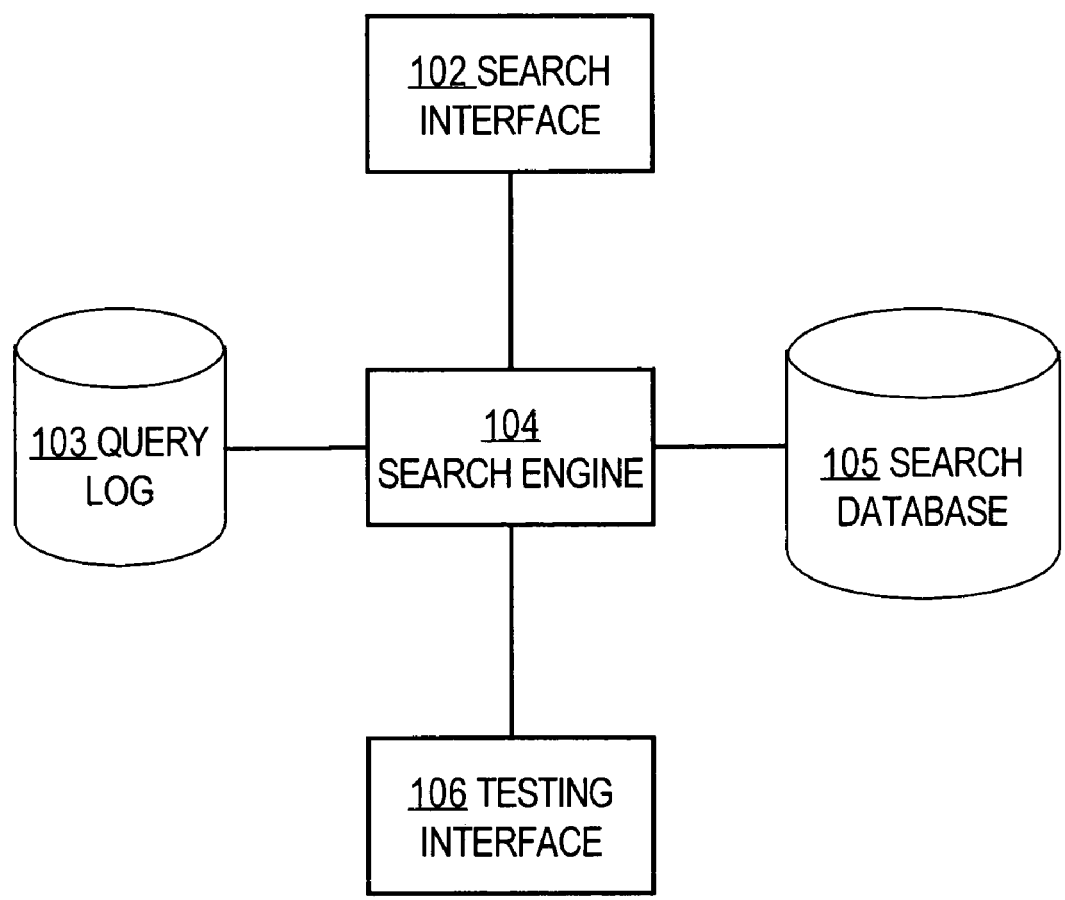
FIG. 1 is a diagram depicting a general overview of a communication system for automatic relevance and variety checking according to one embodiment of the invention.

Referring now to FIG. 1, a system for automatically checking the relevance and variety of search results is shown. The system includes a Search Interface 102, which provides a graphic user interface (GUI) environment for users to submit search queries and receive search results. According to one embodiment, Search Interface 102 is provided as a web application which may be accessed via the Internet or World Wide Web ("Web").

Using Search Interface 102, a user may submit queries to be performed against Search Database 105 using Search Engine 104. Search Database 105 contains data identifying web content, such as web pages and other documents that a user would like to search. In other embodiments, Search Database 105 may contain any type of document such as text documents, audio files, videos and pictures. For example, Search Database 105 may include title and abstract data for a multitude of web pages. Using a web crawler or web robot, a search portal can collect web page data from around the Internet in order to compile a single corpus of web content. The web crawler might retrieve only the title and abstract of web pages or even the full text of web pages for storage in Search Database 105. In some embodiments, Search Database 105 may be any type of data repository, such as a hard disk drive or non-volatile memory containing documents and other data. Such is the case, for example, in an enterprise setting where a user may wish to explore local documents on an enterprise server.

Thus, Search Database 105 may contain a mass amount of data representing many types of content. Therefore, in order to efficiently search for and retrieve data from Search Database 105, a Search Engine 104 is provided. Search Engine 104 utilizes a search algorithm to find content within Search Database 105. In one embodiment, the search algorithm is a series of instructions, which, when executed, cause Search Engine 104 to perform operations against Search Database 105. Typical operations include the selection and retrieval of data from Search Database 105. According to one embodiment, the instructions are in the form of Structured Query Language (SQL) instructions. Further, when a user submits a search query, the search algorithm uses the search query to construct a set of instructions for specifically retrieving data related to the search query. More specifically, the search query is passed as a parameter for an operation to retrieve data from the Search Database 105.

When developing search algorithms for Search Engine 104, developers may find it useful to first test the algorithm in order to ensure that it is producing satisfactory results. Testing Interface 106 may be specifically used for testing search algorithms against Search Database 105 and for editing or manipulating Search Engine 104. Further, Testing Interface 106 may be used for other functions also, such as search engine optimization and debugging. According to one embodiment, Testing Interface 106 provides data indicating whether search results are relevant or contain enough variety. Thus, Testing Interface 106 can be used to check the relevance and variety of search results, and produce test results for developers. Developers may, in turn, use the test results to tweak the search algorithm or other functions of Search Engine 104 as they please.

Related Terms

According to one embodiment, in order to determine the relevance and variety of search results, the method features identifying a set of terms related to a primary search query. A primary query is a phrase or term submitted by a user of a search engine or search portal page. The primary query identifies the content that the user wishes to find. Related terms, on the other hand, are those terms that are not part of a primary query, but which nonetheless have occurred in queries containing similar terms.

Figure 2A:
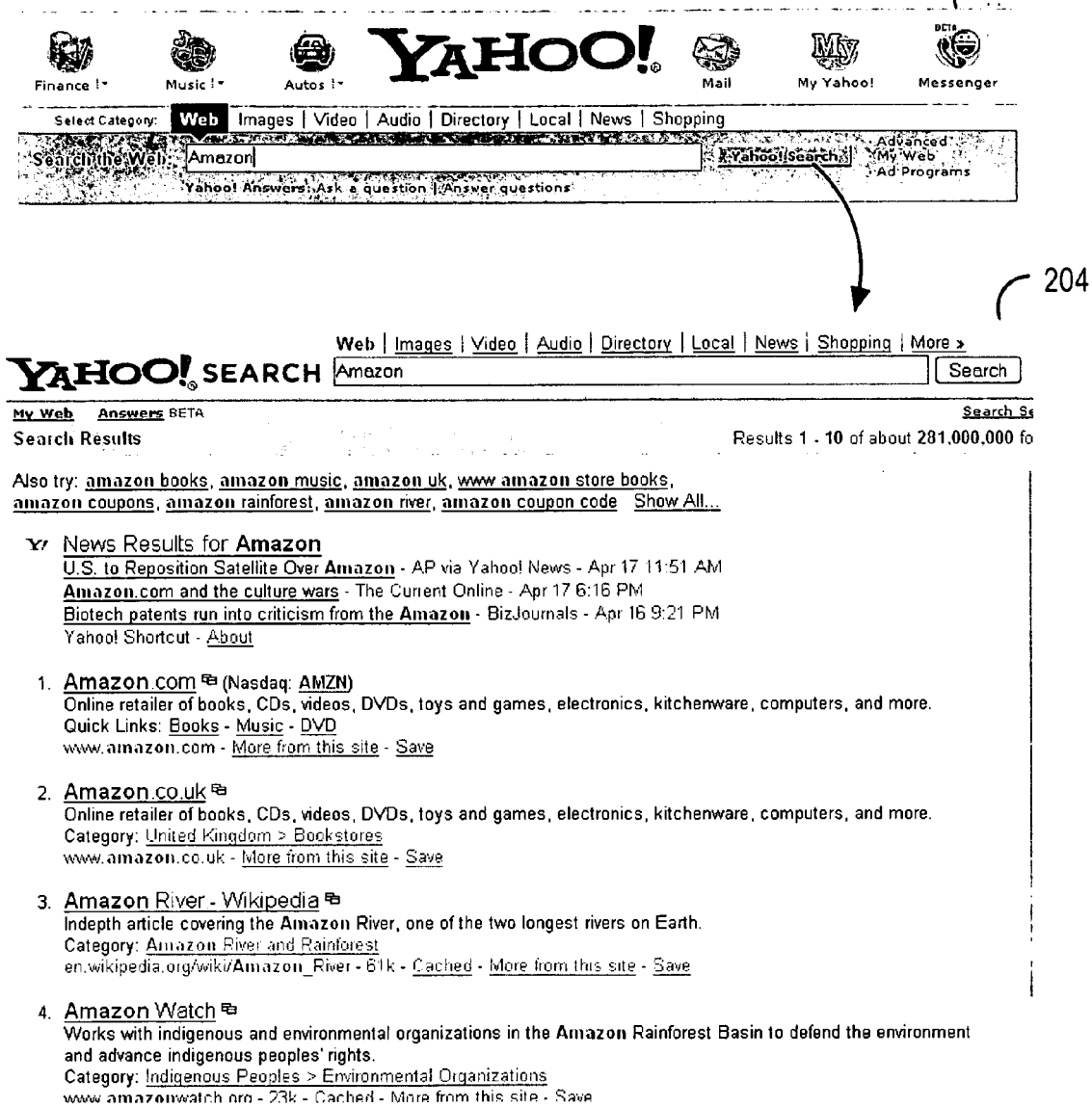
FIG. 2A is a block diagram depicting a query log and a set of related terms according to one embodiment of the invention.

For example, referring now to FIG. 2A, a graphical user interface screen representing a search portal is shown in accordance with one embodiment. On screen 202, a user may submit a primary query identifying content the user wishes to find. According to this embodiment, the primary query is "Amazon." When the query is submitted, the search engine retrieves results related to the query and presents screen 204 to the user. Screen 204 shows a number of results, each result showing at least a title and an abstract to help the user identify the contents of each result. For example, the first listed result on screen 204 identifies the title of the result as "Amazon.com," and the abstract further describes the content as " . . . online retailer of books, CDs . . . " Using this information, a user may select the result. When the user selects the result, the user is presented with the actual web content or re-directed to a web address for accessing the web content.

Note that in many circumstances, a single primary query may consist of a number of sub-topics. For example, if a user submitted a primary query of "Amazon," it would be difficult to automatically determine what concept the user is trying to find. For example, the user might be looking for content relating to "Amazon.com" or content relating to the "Amazon river." However, without actually receiving this exact input from a user, there is no easy way to determine, automatically, that the user is specifying one sub-concept over another. Instead, an embodiment of the invention features examining data sets, including query logs and session based search data to determine the most relevant sub-concepts for any query.

Sub-topics may be initially displayed to a user in order to suggest that the user may use another query to narrow the results. Thus, Screen 204 also contains an "Also Try" area, which suggests alternate search queries for the user. The "Also Try" area identifies combinations of phrases or terms which may help the user narrow his/her search for content. According to one embodiment, a search engine may identify such terms by examining search data such as a Query Log 103 or other session based search data. Similarly, the same data may be used to identify sets of related terms for a primary query.

Many search portal sites have the ability to keep track of the phrase and terms submitted by many users over long periods of time. According to one embodiment, one way of keeping track of search queries and phrases is through the use of a Query Log 103. Query Log 103 is used to track the queries performed by a search engine. Further, query log 103 can keep track of the times at which queries are submitted to the Search Engine 104. In this manner, Query Log 103 can be used both to sequentially track and identify time-sensitive queries. This feature is useful because in many circumstances, queries relating to a particular topic may increase or decrease in number depending on the occurrence of a particular event. In order to identify a relevant set of related terms, a search engine may retrieve only recent data from a query log in order to ensure that the term relevance is up to date. For example, instead of examining queries for an entire year, queries from only the last week may be examined in order to determine which related terms are most relevant at the time the primary query is being submitted.

According to one embodiment, a set of related terms are identified by examining a selected portion of Query Log 103. Query Log 103 may be examined as a whole. Alternatively, in order to provide time-sensitive results, only a portion of the query log might be examined. For example, terms related to a primary query may be identified from examining queries performed within the last week. In another embodiment, however, that Query Log 103 may be considered when identifying related terms for a query.

Figure 2B:
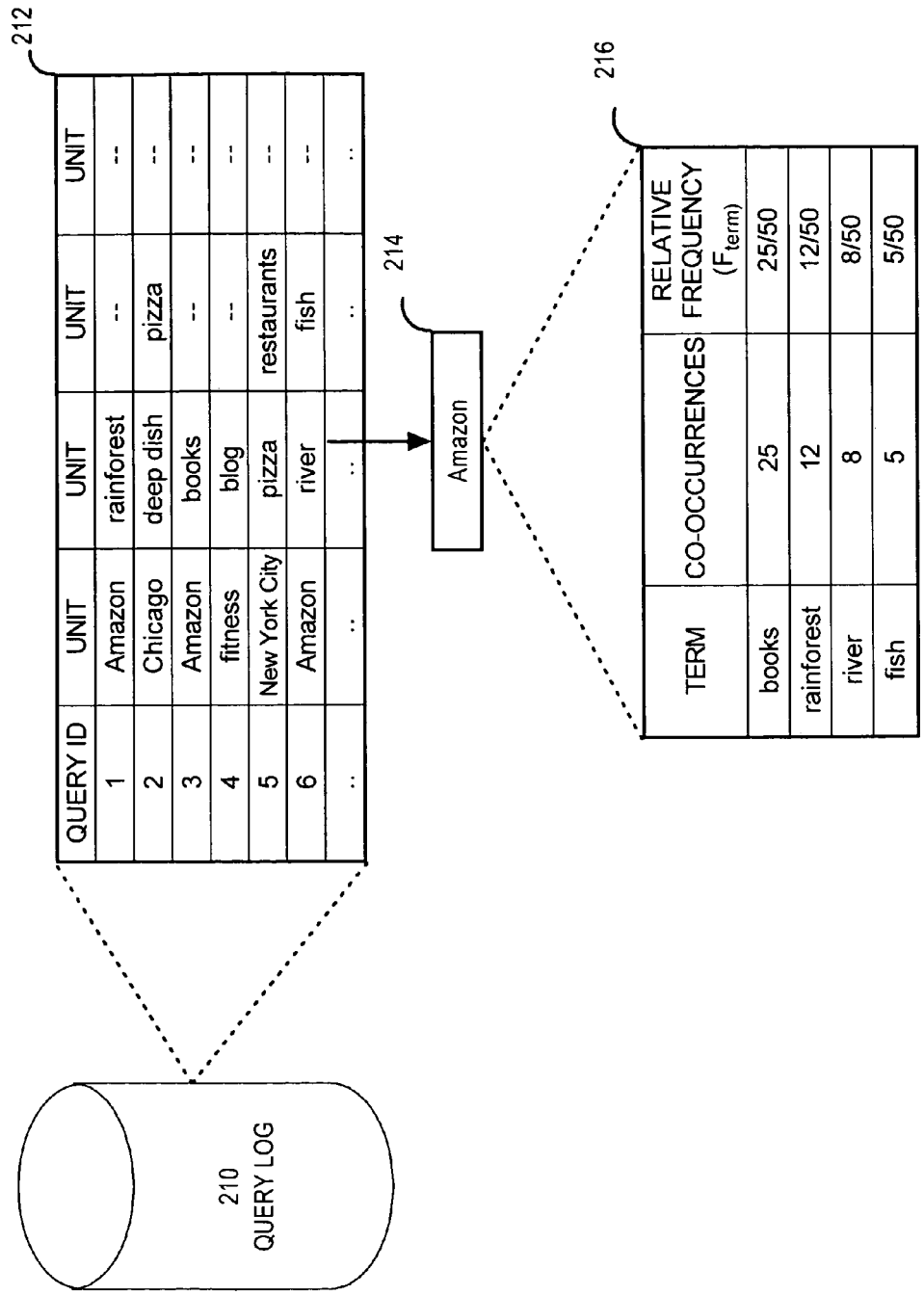
FIG. 2B is a screenshot depicting the graphical user interface of a search portal according to one embodiment of the invention.

Referring now to FIG. 2B, a block diagram depicting a Query Log 210 is shown in accordance with one embodiment. Query Log 210 is shown as containing data represented in tables 212, 214 and 216.

Table 212 contains a log of queries where each row represents a separately submitted query and each column identifies the "units" of each query. According to one embodiment, when queries are submitted, a search engine parses through the query in order to identify "units" of the query. Each "unit" may correspond to a distinct phrase, term or concept recognized by the search engine. For example, the query "Amazon rainforest" is shown as being two distinct units "Amazon" and "rainforest", because the units both identify distinct terms and concepts. Therefore, when submitted by a user, queries are parsed and stored as one or more units within Query Log 210. Additional details of the above feature are described in U.S. patent application. Ser. No. 10/713,576, entitled "Systems and Methods for Generating Concept Units from Search Queries," owned by the Applicant and fully incorporated herein by reference.

Query Log 210 may store data for any number of queries. However, for the purpose of identifying a set of related terms, Search Engine 104 may select queries from a limited time frame as described above. For example, in order to remain time-sensitive, queries from only the last week or month may be selected from Query Log 210. As such, terms that may have been relevant to a query more than a month ago may not be relevant to the same query in the future. For instance, if an earthquake took place in the Amazon rainforest a month ago, then, when the event occurred, queries for "Amazon earthquake" might have heavily outweighed any other query related to "Amazon." However, a couple months later, the same query might not be as relevant. Therefore, in one embodiment, in order to produce relevant sets of related terms, only a portion of Query Log 210 might be selected. According to this particular embodiment, table 212 includes part of the selected portion of Query Log 210.

Once the appropriate portion of Query Log 210 is selected, Search Engine 104 may retrieve all previous queries containing primary query 214 ("Amazon") for inspection. When these previous queries are retrieved, the Search Engine 104 identifies, within table 212, units that were not part of the primary query 214 but were nonetheless submitted along with the primary query. Thus, if any unit appears on the same row as "Amazon," that unit is considered to be a related term. When all related terms have been identified, a set of related terms is constructed as represented by table 216.

Further, when the related terms are identified, Search Engine 104 can search through the selected portion of Query Log 103 to determine how many times each unit "co-occurred" with the primary query "Amazon." A unit co-occurs with a primary query when that unit is contained on the same row and separate column of Query Log 103, thus indicating that the term was used to qualify a query further. If a particular term is submitted frequently with "Amazon," then that term is likely more relevant than other terms. Therefore, counting the co-occurrences of particular terms with a primary query is useful. Search Engine 104 thus creates a set of related terms by searching a portion of Query Log 103 and further counts the co-occurrences of each related term within the portion of Query Log 103. The set of related terms identified by Search Engine 104 is represented in table 216. Table 216 shows a listing of related terms, including the number of co-occurrences of each term with the primary query "Amazon" within the selected portion of Query Log 210, represented by table 212.

In another embodiment, a set of related terms may be identified by examining session based search data. A search session can be defined as multiple search query submissions within a related timeline. For example, a user may initiate a search using a first search query. The user may be presented with results. In many cases, the user may not be satisfied with the original search results and decide to use a second query to search for the same content. The second query may contain terms different from the first query. Therefore, using search interface 102, a user can submit a new query to get more accurate results. Session-based search terms are helpful because users typically search for the same content within a specified time period or session. Therefore, session based search terms are another source for identifying a set of related terms.

Relative Term Frequency

According to one embodiment, once a set of related terms is identified, the relative frequency of each related term is calculated. For each related term, its relative frequency corresponds to the amount of times the term co-occurs with the primary term within the selected portion of the query log. The co-occurrences of a particular term is compared to the total amount of co-occurrences for all terms within the set. According to one embodiment, the relative term frequency $F_{relative}$ of a particular term x is a ratio of its frequency $F_{term}$ to the total frequency of all terms $F_{total}$, within the set of terms, or:

$$F_{relative} x = F_{term} x / F_{total}$$

For example, referring to table 216, the $F_{term}$ of the term "books" is 25, meaning that "books" co-occurred with "Amazon" 25 times within the selected portion of Query Log 210, represented by table 212. Further, the $F_{total}$ is 50, corresponding to the total number of co-occurrences for all terms within the set of table 216. Therefore, a determination can be made that the $F_{relative}$ of the term "books" is 25/50 or 50%. Table 216 further contains the relative term frequencies of all the other terms within the set of related terms. Specifically, the term frequency of "rainforest" is 12/50, or 24%, of "river" is 8/50, or 16%; and of "fish" is 5/50, or 10%. The relative term frequency of each related term in the set is used to determine both the relevance and variety of search results for a primary query as further described herein.

Using the relative term frequencies, the following approaches may be used to determine the relevance and/or variety of search results produced by a search engine using the primary query, in this instance, "Amazon."

Relevance Checking

Figure 3:
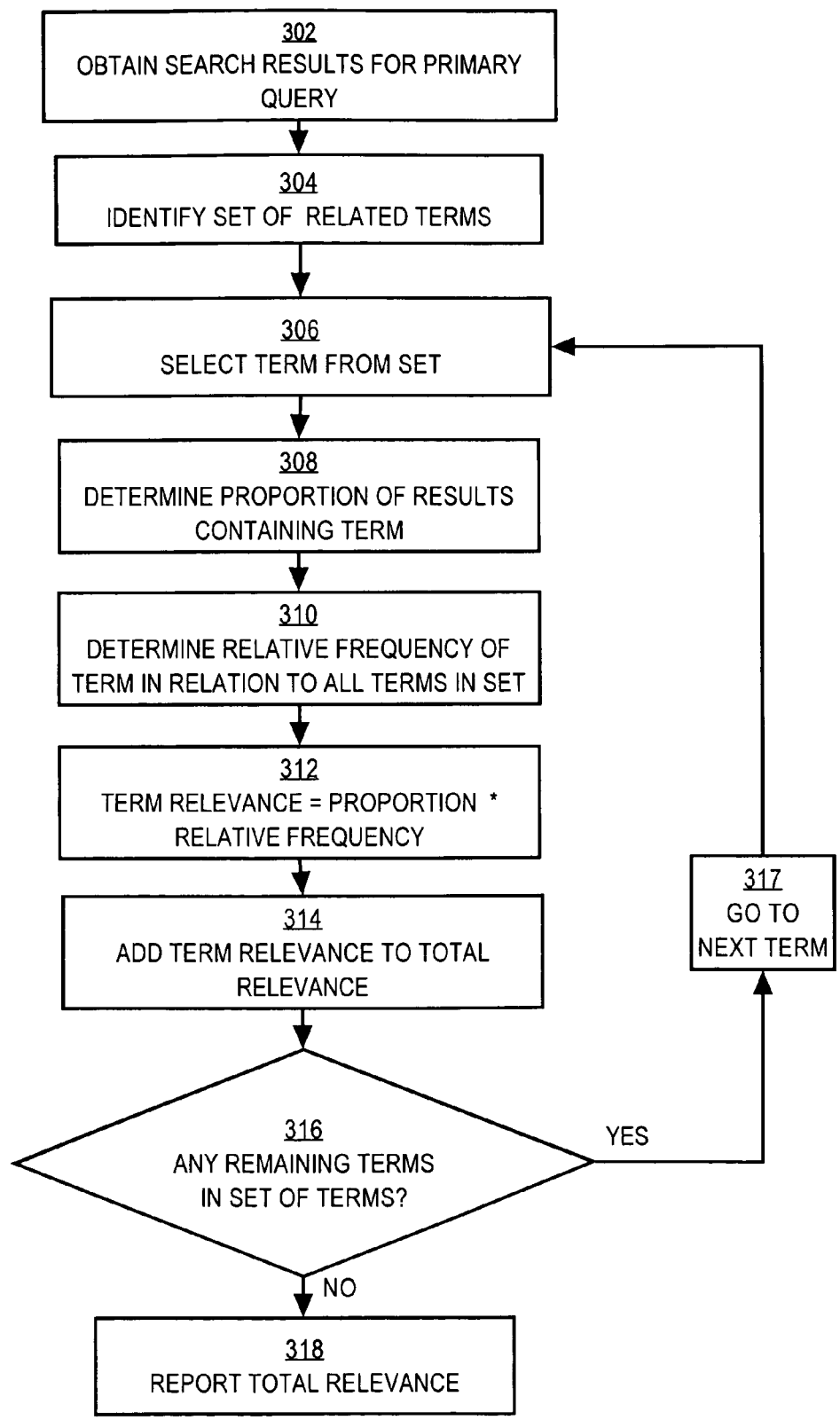
FIG. 3 is a flow diagram depicting one approach for automatically checking the relevance of search results according to one embodiment of the invention.

One approach for checking the relevance of search results includes determining whether the correct ratio of the top n related terms occurs within the top m results. If the ratios are sufficiently similar, then the relevance of the results is good, and vice versa. Referring now to FIG. 3A, a flowchart depicting one approach for checking the relevance of search results is shown in accordance with one embodiment. As discussed earlier, when a user would like to perform a search for content, the user submits a query containing terms or phrases for identifying the content. At step 302, the query is processed by a search engine and search results are obtained for the query. According to one embodiment, the top m search results are obtained and listed in any order, as deemed appropriate by the search engine. As shown previously in FIG. 2A, the search engine displays the title and abstract of each result to the user.

Next, at step 304, a set of related terms is identified according to the process described above in reference to FIG. 2B. The terms are related to the search query, and as shown, each term is a "unit" associated with the primary query. These terms are grouped together into a set of terms as depicted in table 216. According to one embodiment, only a particular number of terms are selected for the set, and in this embodiment, four terms are included. Hence, the set of terms in table 216 consist of the top four related terms. In other embodiments, any number of related terms may be selected for inclusion in the set of terms.

At step 306, a particular term is selected from the set in table 216. Next, at step 308, each search result is scanned to determine if any of the results contain the selected term. According to one embodiment, search engine 104 determines whether a result contains the selected term by scanning the title and abstract of each result. If either the title or abstract contains the term, then the result is counted. Alternatively, Search Engine 104 can examine the actual web content associated with the result. The web content may be a collection of documents or web pages containing text and images. If the term is found within a result's actual content, then Search Engine 104 will count the result as containing the selected term.

Search Engine 104 keeps track of the number of search results in which the term was found at least once. This number is compared to the total number of search results searched. As a result, the proportion of search results containing the particular term is determined. Thus, if $F_x$ is the quantity of results in which a term x has been found in, and m is the total number of results searched, then the proportion of results containing the term x is:

$$F_x/m$$

For instance, if the top ten results were obtained for a search query of "Amazon," and if a set of related terms included the term "river," and if only one of the top ten results also contained the term "river," then the proportion of search results containing the term "river" would be 1/10. Therefore, at step 306, a determination would be made that the value for the proportion is 10%.

Further, the relative frequency of the particular term in relation to all terms in the set is determined at step 310. The relative term frequency is determined by counting the number of co-occurrences within Query Log 210 for comparison to the co-occurrences of all terms in the set of related terms within query log 210. For example, referring again to FIG. 2B, table 216 shows a set of related terms associated with the query "Amazon." According to this embodiment, the term "river," for example, occurred eight times within the selected portion of the Query Log 210. In relation to all terms in the related term set, the frequency of co-occurrences for "river" is 8/50, or 16%. This relative frequency is used in part to calculate the relevance of the term within the search results, hereby referred to as the Term Relevance. The Term Relevance $R_{term}$ is a ratio representing the relevance of a particular term x. The Total Relevance $R_{total}$ of all search results is a sum of the Term Relevance $R_{term}$ for each term x . . . x+n within the set of related terms.

At step 312, the Term Relevance is calculated by taking the product of both (1) the proportion of results containing the particular term from step 306 and (2) the relative term frequency from step 308. For any term x in the set of related terms, $F_x$ is the frequency of x within m search results, while $F_{relative}$ is the relative term frequency:

$$R_{term}x = F_x/m * F_{relative}x$$

This Term Relevance is then added to the Total Relevance $R_{total}$ in step 314. Depending on the number of terms within the set of related terms, as shown in step 316, the process may continue to step 317 where the next term is selected. The Term Relevance $R_{term}$ for the next term is calculated and added to the Total Relevance $R_{total}$. Hence, assuming x+n number of terms, the Total Relevance $R_{total}$ for search results may be calculated with the following formula, where $R_{total}$ is the Total Relevance and $R_{term}$ is Term Relevance:

$$R_{total} = R_{term}x + R_{term}x+1 + \ldots + R_{term}x+n$$

At step 318, the value of $R_{total}$ is reported. The value may be reported in any appropriate manner. For example, the value may be displayed. In essence, the value of $R_{total}$ indicates the relevance of the search results. According to one embodiment, the Total Relevance $R_{total}$ of any search results will be a value between 0 and 1. This is because if all terms occurred in all results with the correct frequency, the $R_{total}$ add up to 1. If the value is 1, then the search results are completely relevant, while if the value is 0, then the search results are not relevant at all. For example, a reported value of 0 will indicate that none of the related terms occurred within the search results. Because none of the terms occurred, the search results are not relevant. According to one embodiment, the value of $R_{total}$ may be reported to a search engine developer utilizing the Testing Interface 106 to test a search algorithm. Using the reported value, the developer may decide to change the search algorithm to produce more relevant results. Alternatively, the value of $R_{total}$ may be reported to any other component of the system, such as Search Engine 104, which may respond automatically by analyzing the value of $R_{total}$, determining if the value has passed some threshold, and causing the search algorithm to change.

Variety Checking

Another use for the set of related terms includes checking the variety of search results. Adequate variety within search results may be calculated by determining the loss in variety that occurs when a particular term is not found within any of the top n results. Put differently, the variety of search results are analyzed by determining how many terms in the set of related terms appear within the top m search results.

Figure 4:
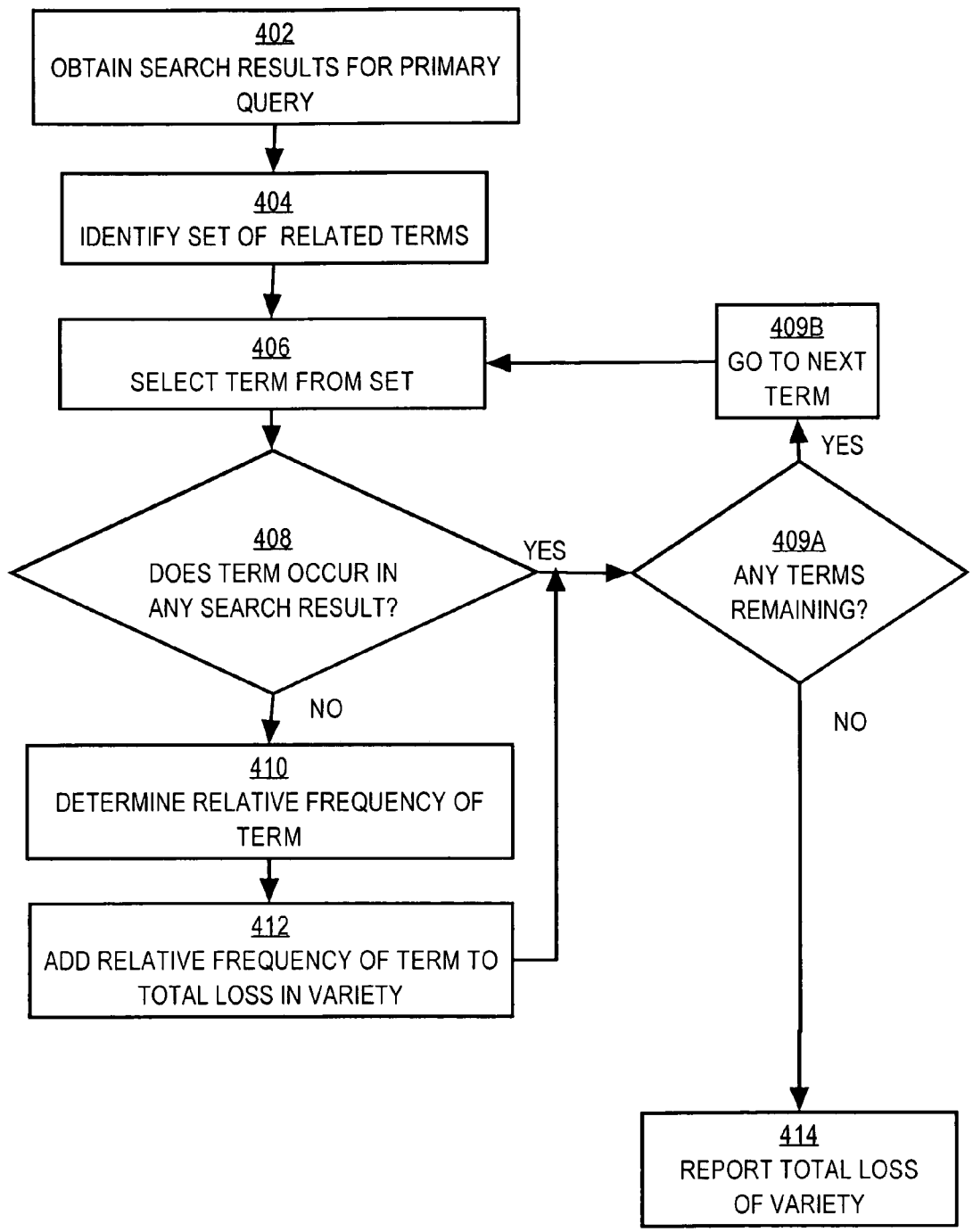
FIG. 4 is a flow diagram depicting one approach for automatically checking the variety of search results according to one embodiment of the invention.
Figure 5:
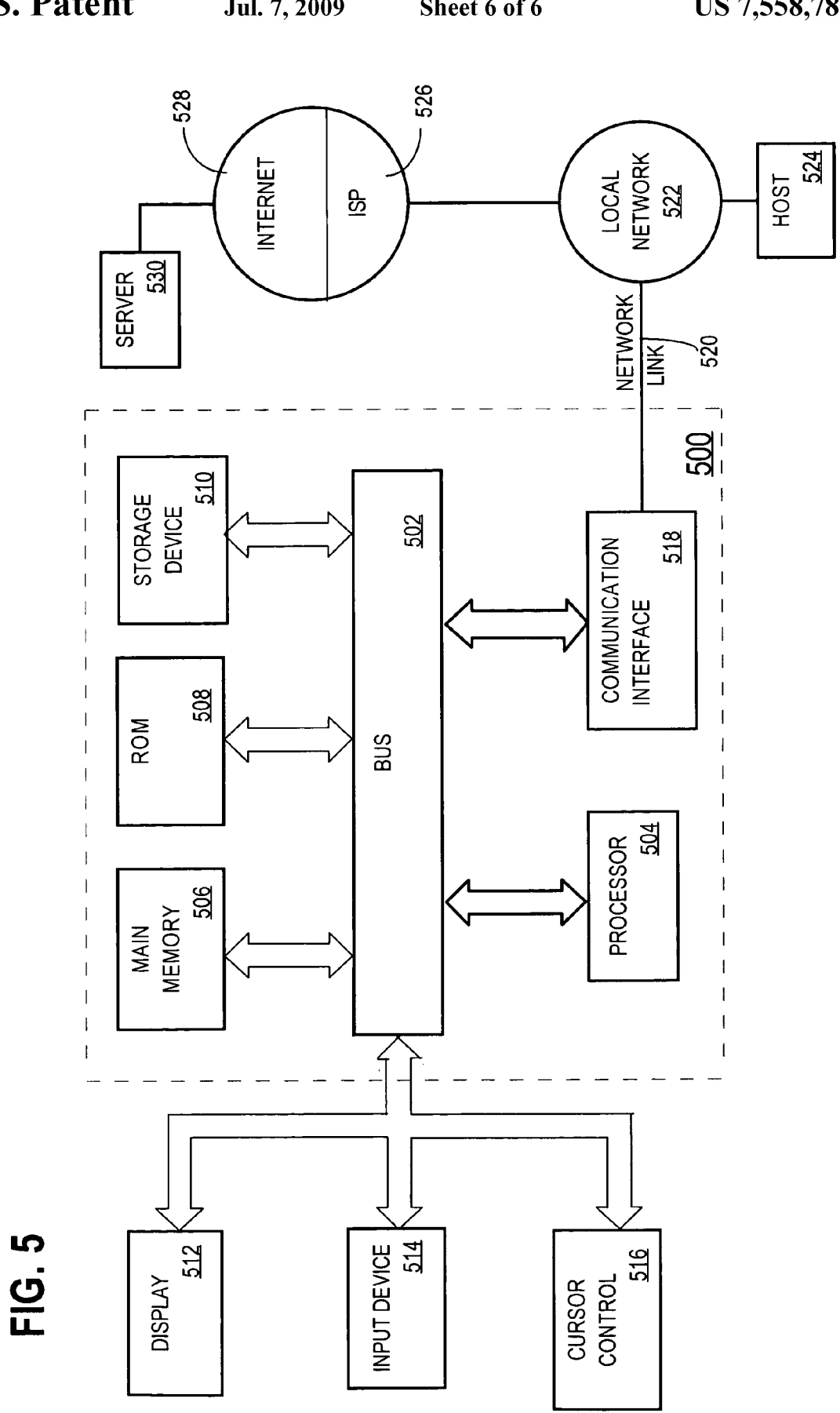
FIG. 5 is a block diagram of a computer system upon which embodiments of the invention may be implemented.

Referring now to FIG. 4, a flow diagram depicting one approach for automatically checking the variety of search results is shown. As is done in relevance checking, at steps 402, 404, and 406, a number of search results are obtained for the primary query, a set of related terms is identified, and a particular term is selected from the set. In the instance of variety checking, the number of search results obtained may be expanded in order to test the variety of those results more accurately.

At step 408, it is determined whether the particular term has occurred within any of the results. If any of the results contain the term, then it a determination may be made that there is no loss in variety in the search results for that particular term. More specifically, if a term occurs in at least one of the search results, then the results have enough variety in relation to that term.

However, in order to check the variety of results automatically, the loss in variety that occurs due to an absence of a related term within a set of results is determined. Therefore, if a particular term is found within the results, then this fact is ignored, and at step 409A, a determination is made as to whether any other terms remain in the set of related terms. If so, then the next term is selected at step 409B and the process is repeated.

If a particular term is not found within any of the results, then at step 410, the relative term frequency $F_{relative}$ of the term is calculated. The relative term frequency is calculated in an identical manner as done during relevance checking. Specifically, the relative term frequency is determined by comparing the number of co-occurrences for that term within Query Log 210 to the co-occurrences of all terms in the set of related terms. Again, referring to FIG. 2B, each term within the set of related terms in table 216 has a relative term frequency.

If one of the terms is not in the search results, then a determination may be made that a loss in variety for the term $L_{term}$ has occurred corresponding to the relative term frequency $F_{relative}$ of the term within the set of related terms. Therefore, the loss in variety for a term x is:

$$L_{term}x = F_{relative}x$$

For example, the term "rainforest" has a relative term frequency of $^{12}\!/_{50}$, or 24%. If the term "rainforest" did not appear within any of the results, then a determination may be made that the $L_{term}$ for "rainforest" is $^{12}\!/_{50}$, or 24%.

Hence, if, using a particular search engine, a query of "Amazon" did not produce any results containing the term "books," then the relative term frequency of "books" would be $^{25}\!/_{50}$, or 50%. This number is used as the relative term frequency of step 412.

This process is repeated for each term. If a particular term does occur within the results, an $L_{term}$ of 0 for the term is reported. At step 412, the Total Loss in Variety, $L_{total}$, is calculated as a sum of each term's x ... x+n loss in variety, $L_{term}$, where x+n is the total number of related terms in the set, and each $L_{term}$ is proportional to the relative term frequency:

$$L_{total} = L_{term}x + L_{term}x+1 + \ldots + L_{term}x+n$$

If a particular related term does occur within the search results, then that term's $L_{term}$ will be 0. Steps 402 through 412 are repeated for each term within the set of terms listed in table 216. At step 414, if no more terms are to be accounted for, then the Total Loss in Variety, $L_{total}$, is reported. Again, according to one embodiment, the value of $L_{total}$ may be reported to a search engine developer utilizing Testing Interface 106 to test a search algorithm. Using the reported value, the developer may decide to change the search algorithm to produce results with more variety. Alternatively, the value of $L_{total}$ may be reported to any other component of the system, such as Search Engine 104, which may respond automatically by analyzing the value of $L_{total}$, determining if the value has passed some threshold, and causing the search algorithm to change.

In one embodiment, at most, the value of $L_{total}$ will be a value equal to 1. In such an embodiment, the only way for this to occur would be if none of the related terms were found in the search results. This is because the relative term frequencies for all related terms within the set, when added together, will come out to 1. In the case of table 214, the $L_{total}$ would be:

$$L_{total} = {}^{25}\!/_{50} + {}^{12}\!/_{50} + {}^{8}\!/_{50} + {}^{5}\!/_{50} = {}^{50}\!/_{50} = 1$$

Alternatively, if all terms showed up at least once within the search results, then the total loss in variety, $L_{total}$, would be a value of 0. Therefore, a $L_{total}$ of 0 would mean there was complete variety within the search results for the set of related terms.

Using the techniques described above, both the relevance and variety of search results may be determined. However, the relevance and variety of search results might not be related. For instance, some search results may be completely relevant but also completely lack variety. This would be the case if a primary query did not contain many sub-topics. For instance, if the relative term frequency of "books" were 90%, or $^{45}\!/_{50}$, in table 216, then 90% of the search results obtained might possibly refer to books, while the rest of the search results might be distributed evenly among the rest of the related terms within the set. Because the ratios are similar, the search results are relevant. However, the loss in variety may also take into account the relevancy of each term as determined by the relative term frequency. Hence, if the relative term frequency of a particular term is high, meaning that the particular term is a more relevant term, its absence from the search results will cause a higher loss in variety. Similarly, if particular term's relative term frequency is low, meaning that the particular term is not a relevant term, the particular term's absence from search results will not have a great impact on the variety of the results. Thus, the loss in variety for search results may also take into account the relevance of the terms which were not found within the results.

Hardware Overview

FIG. 4 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising a computer system implementing a testing interface that allows testing of a loss in variety of a set of results returned by a specific search query, wherein implementing the testing interface comprises the steps of:
    identifying a set of one or more terms related to the specific search query;
    wherein the set of one or more terms are not part of the specific search query;
    obtaining a plurality of search results for the specific search query;
    determining a first number of results of the plurality of search results;
    determining a second number of results for each term of the set of one or more terms related to the specific search query, wherein the second number is the number of results that contain said each term;
    determining, for said each term, a third number of historical search queries, and adding said third number to a running total;
    wherein said third number is based on a count of those historical search queries that include both the specific search query and said each term;
    determining a first ratio of said third number to the running total;
    determining a second ratio of the second number to the first number;
    determining a relevance of the set of results;
    wherein the set of results includes the plurality of search results, and
    wherein determining the relevance of the set of results is based at least in part on:
        (a) said second ratio, for one or more related terms, of the second number to the first number; and
        (b) said first ratio, for one or more related terms, of said third number to the running total.

2. The method of claim 1,
wherein a query is a collection of one or more terms submitted by a user for identifying content for which a user wishes to search; and
wherein identifying the set of one or more terms includes examining a query log containing a plurality of queries, wherein examining the query log further comprises:
selecting one or more queries from the query log; and
determining that the one or more queries further contain the specific search query.

3. The method of claim 2, wherein each query within the query log includes data specifying a time period at which said each query was newly submitted, and wherein selecting one or more queries from the query log includes selecting one or more queries submitted only within a specified time period.

4. The method of claim 1, wherein identifying the set of one or more terms includes examining session based search data that includes only queries submitted by a single user during a specified period of time.

5. The method of claim 1, wherein obtaining the plurality of search results for the specific search query further comprises:
performing operations against a data repository, wherein the data repository contains an index of content; and
in response to performing the operations, receiving data representing the plurality of search results.

6. The method of claim 1, wherein each result of the plurality of search results contains a title and an abstract, and wherein determining said ratio of the second number to the first number includes examining the title and abstract of each result to determine whether said each term is present.

7. The method of claim 5, wherein each result of the plurality of search results is associated with web content, and wherein determining said ratio of the second number to the first number includes examining the web content associated with each result to determine whether the particular term is contained within the web content.

8. The method of claim 1, wherein determining the relevance of a set results includes:
determining the relevance of each search result in the plurality of search results based on each term in the set of one or more terms;
generating a total relevance for the set of results based on all the terms in the set of one or more terms; and
the steps further comprise:
generating a value representing the relevance of the set of results; and
reporting the total relevance for the set of results.

9. The method of claim 1, further comprising:
determining that none of the results in the set of results contain a particular term from the set of one or more terms; and
determining, based at least in part on the ratio of said third number of the particular term to the running total, the loss in variety for the set of results.

10. A method comprising the steps of:
a computer identifying a set of one or more terms related to a specific search query;
wherein the set of one or more terms are not part of the specific search query;
the computer determining, for each term of the set of one or more terms, a third number of historical search queries, and adding said third number to a running total;
wherein said third number is based on a count of those historical search queries that include both the specific search query and said each term;
determining a ratio of said third number to the running total;
the computer obtaining a plurality of search results for the search query;
the computer determining that none of the results in the plurality of search results contain a particular term from the set of one or more terms;
the computer generating a value representing a loss in variety for a set of results;
wherein the set of results includes the plurality of search results, and
wherein generating the value representing the loss in variety for the set of results is based at least in part on the ratio of said third number, for each term of the set of one or more terms, to the running total; and
the computer reporting the value representing the loss in variety for the set of results.

11. The method of claim 10, wherein identifying the set of one or more terms includes examining session based search data that includes only queries submitted by a single user during a specified period of time.

12. The method of claim 10, wherein obtaining the plurality of search results for the specific search query further comprises:
performing operations against a data repository, wherein the data repository contains an index of content; and
in response to performing the operations, receiving data representing the plurality of search results.

13. The method of claim 10, wherein each result of the plurality of search results contains a title and an abstract, and wherein determining that none of the results contain the particular term includes examining the title and abstract of each result to determine that the particular term is not present.

14. The method of claim 12, wherein each result of the plurality of search results is associated with a content page, and wherein determining that none of the results contain the particular term includes examining the content page associated with each result to determine that the particular term is not contained within the content page.

15. The method of claim 10, wherein
the query is a collection of one or more terms submitted by a user for identifying content for which a user wishes to search; and
wherein identifying the set of one or more terms related to the search query includes examining a query log, wherein the query log contains a plurality of search queries;
wherein examining the query log further comprises:
selecting one or more queries from the query log; and
determining that the one or more queries further contain the specific search query.

16. The method of claim 15, wherein:
determining the value representing the loss in variety of the set of results for each term in the set of one or more terms, wherein the loss in variety for said each term of the set of one or more terms is determined by the steps comprising:
assigning a zero value if said each term is found in the set of results;
if said each term is not found in the results, assigning a non-zero value that is a $$\frac{F_{termx}}{F_{total}}$$

wherein $F_{total}$ is the total number of historical queries in the query log containing the search query and any term of the set of one or more terms and $F_{termx}$ is the number of historical queries in the query log containing both said each term and the search query; and generating a total loss in variety of the set of results further comprises adding together the value representing the loss in variety of the set of results for each term in the set of one or more terms.

17. The method of claim 10, wherein the loss in variety measures a lack of sub-topics found within a set of search results;

wherein the sub-topics are associated with a general topic; and wherein the sub-topics are comprised of the set of one or more terms, and the general topic is comprised of the terms in the search query.

18. The method of claim 10, further comprising:

in response to determining the loss in variety for a set of results;

changing the search engine search algorithm;

after changing the search algorithm, performing the specific search query;

computing a loss in variety based on said set of one or more terms; and determining no loss in variety for the set of results.

19. A computer-readable storage medium carrying one or more sequences of instructions which, when executed by one or more processors, causes the one or more processors to perform the steps of:

identifying a set of one or more terms related to a specific search query;

wherein the set of one or more terms are not part of the specific search query;

obtaining a plurality of search results for the specific search query;

determining a first number of results of the plurality of search results;

determining a second number of results for each term of the set of one or more terms, wherein the second number is the number of results that contain said each term;

determining, for said each term, a third number of historical search queries, and adding said third number to a running total;

wherein said third number is based on a count of those historical search queries that include both the specific search query and said each term;

determining a first ratio of said third number to the running total;

determining a second ratio of the second number to the first number;

determining a relevance of a set of results;

wherein the set of results includes the plurality of search results, and wherein determining the relevance of the set of results is based at least in part on:

(a) said second ratio, for one or more related terms, of the second number to the first number; and (b) said first ratio, for one or more related terms, of said third number to the running total;

determining that none of the results in the set of results contain a particular term from the set of one or more terms related to the specific search query; and determining, based at least in part on the ratio of said third number of the particular term to the running total, a loss in variety for the set of results.

20. The computer-readable medium of claim 19, wherein identifying the set of one or more terms includes examining session based search data that includes only queries submitted by a single user during a specified period of time.

21. The computer-readable medium of claim 19, wherein determining the relevance of a set results includes:

determining the relevance of each search result in the plurality of search results based on each term in the set of one or more terms;

generating a total relevance for the set of results based on all the terms in the set of one or more terms; and the one or more sequences of instructions causes the one or more processors to further perform the steps of:

generating a value representing the relevance of the set of results; and reporting the total relevance for the set of results.

22. The computer-readable medium of claim 19, wherein the one or more sequences of instructions causes the one or more processors to provide:

an implementation of a testing interface that allows testing of at least one of:

(a) the relevance of the set of results returned by said specific search query; and (b) the loss in variety of the set of results returned by said specific search query.

23. A computer-readable storage medium carrying one or more sequences of instructions which, when executed by one or more processors, causes the one or more processors to perform the steps of:

a computer identifying a set of one or more terms related to a specific search query;

wherein the set of one or more terms are not part of the specific search query;

determining, for each term of the set of one or more terms, a third number of historical search queries, and adding said third number to a running total;

wherein said third number is based on a count of those historical search queries that include both the specific search query and said each term;

determining a ratio of said third number to the running total;

obtaining a plurality of search results for the search query;

determining that none of the results in the plurality of search results contain a particular term from the set of one or more terms; and generating a value representing a loss in variety for a set of results;

wherein the set of results includes the plurality of search results, and wherein generating the value representing the loss in variety for the set of results is based at least in part on the ratio of said third number, for said each term of the set of one or more terms, to the running total; and reporting the value representing the loss in variety for the set of results.

24. The computer-readable medium of claim 23, wherein identifying the set of one or more terms includes examining session based search data that includes only queries submitted by a single user during a specified period of time.

25. The computer-readable medium of claim 23, wherein the loss in variety measures a lack of sub-topics found within a set of search results;

wherein the sub-topics are associated with a general topic; and wherein the sub-topics are comprised of the set of one or more terms, and the general topic is comprised of the terms in the search query.

26. The computer-readable volatile or non-volatile medium of claim 23, wherein generating the value representing the loss in variety of the set of results further comprises adding together the value representing the loss of variety for said each term in the set of one or more terms that is determined by:

assigning a zero value if said each term is found in the set of results; or assigning a non-zero value, if the term is not found in the results, wherein the non-zero value is a function of the ratio of the third number of said each term to the running total.

* * * * *

UNITED STATES PATENT AND TRADEMARK OFFICE
CERTIFICATE OF CORRECTION

PATENT NO. : 7,558,787 B2  Page 1 of 1
APPLICATION NO. : 11/481735
DATED : July 7, 2009
INVENTOR(S) : Jignashu G. Parikh It is certified that error appears in the above-identified patent and that said Letters Patent is hereby corrected as shown below:

On the title page item (58), delete "See application file for complete search history" and insert --Priority to India patent application no. 1201/DEL/2006 filed May 16, 2006.--.

At column 14

Claim 16: Line 61: after "that is a" insert --function of:--.

Signed and Sealed this

Twenty-second Day of December, 2009

David J. Kappos
*Director of the United States Patent and Trademark Office*